UNITED STATES PATENT OFFICE.

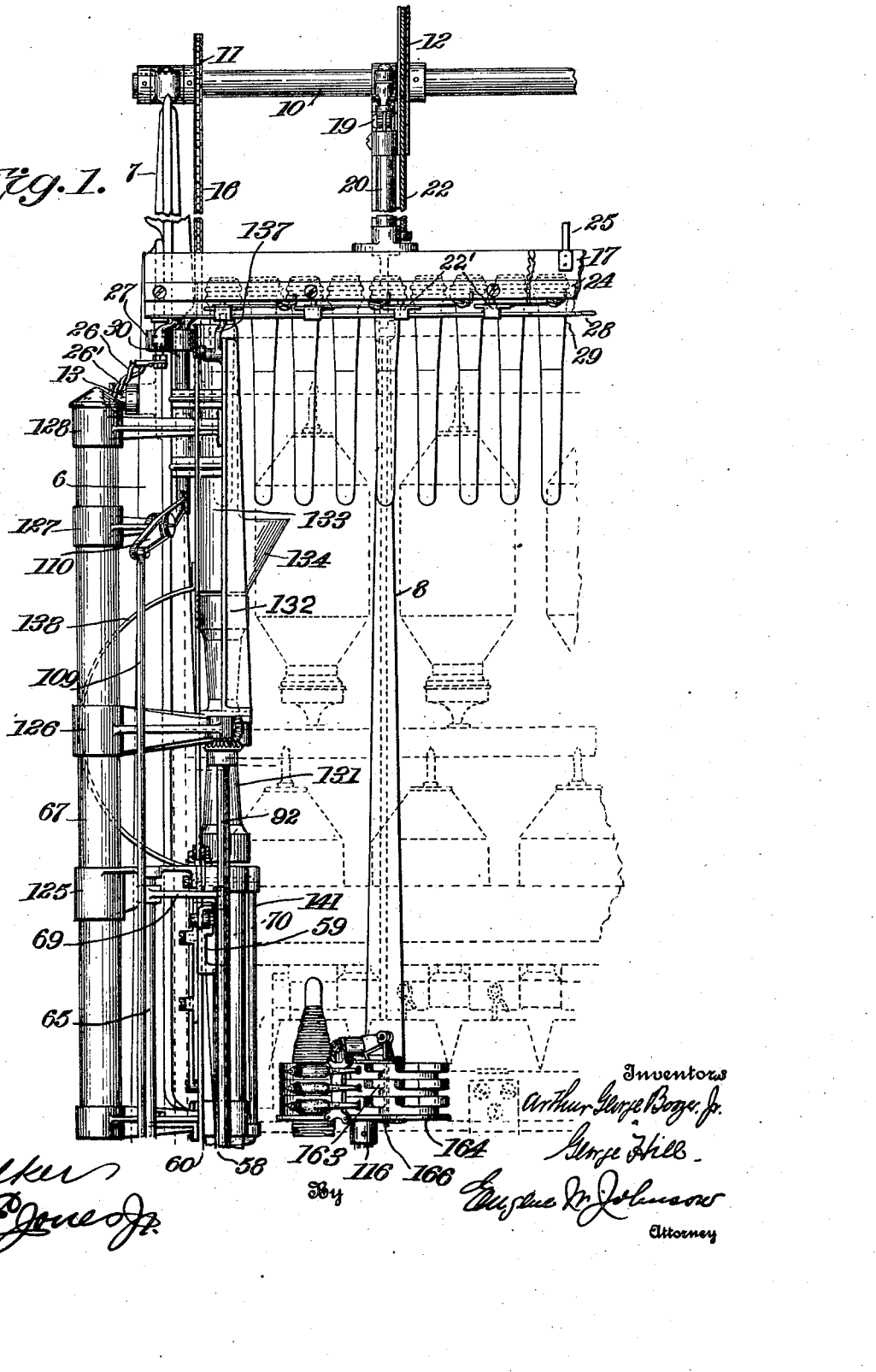

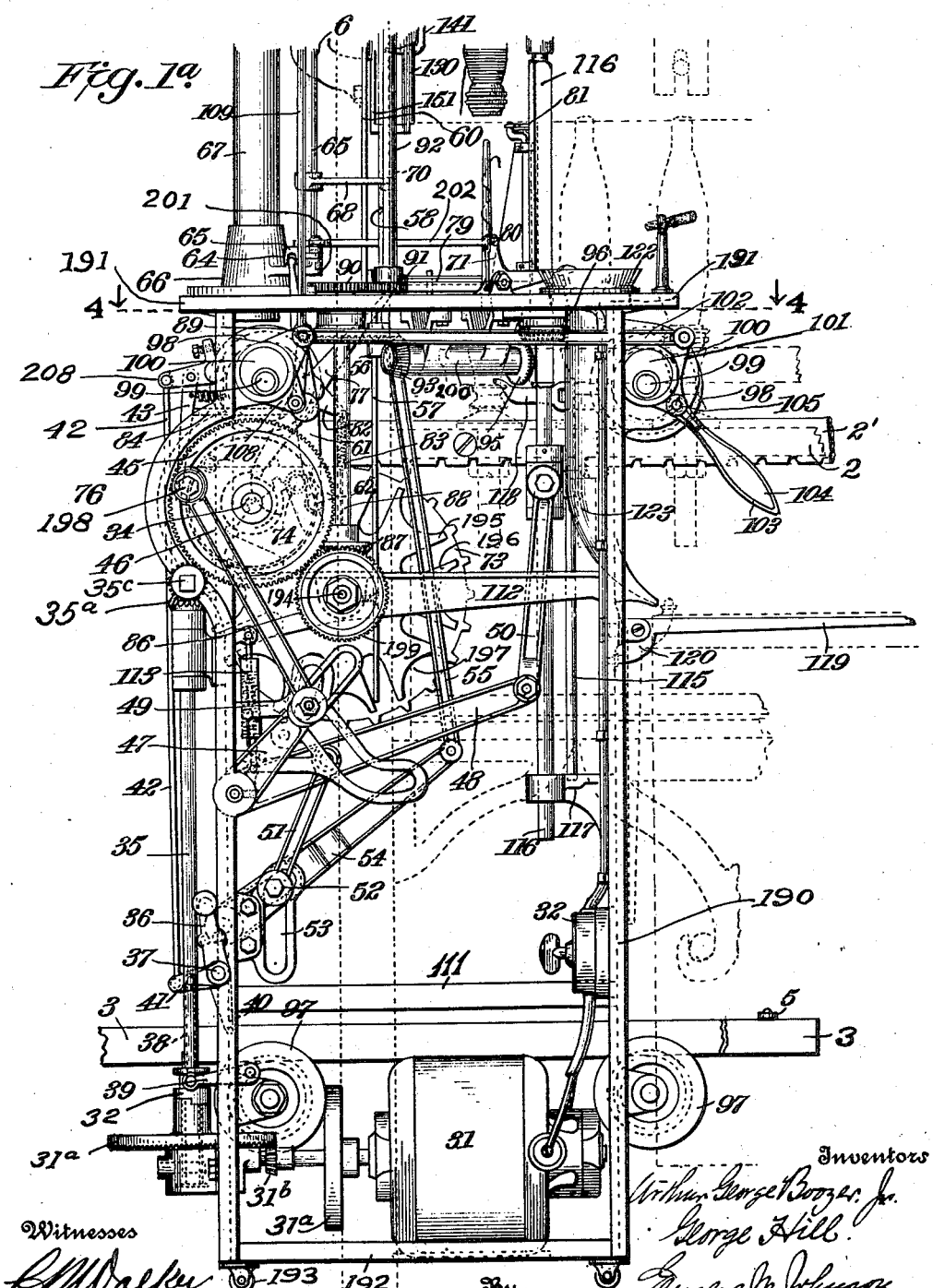

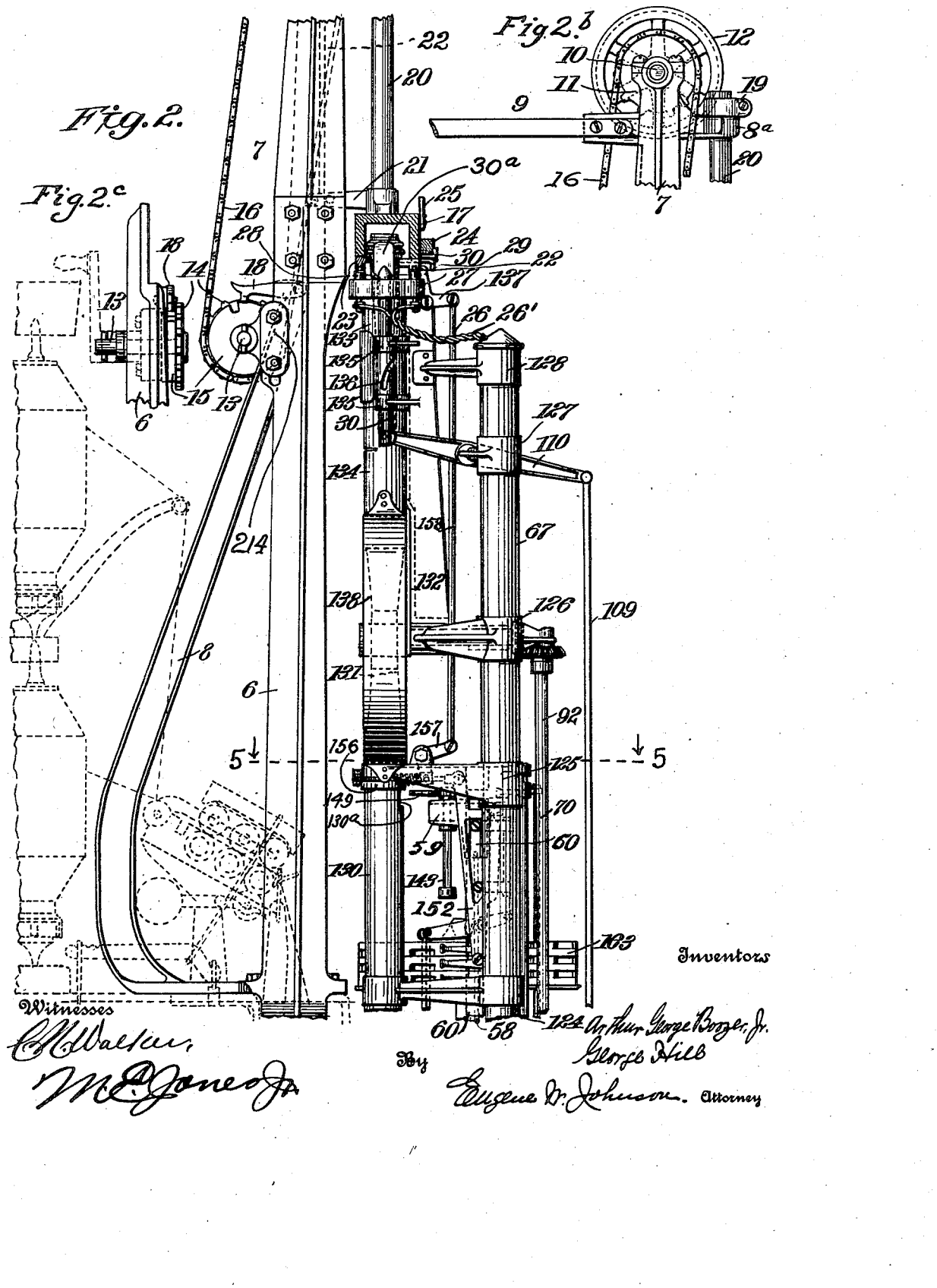

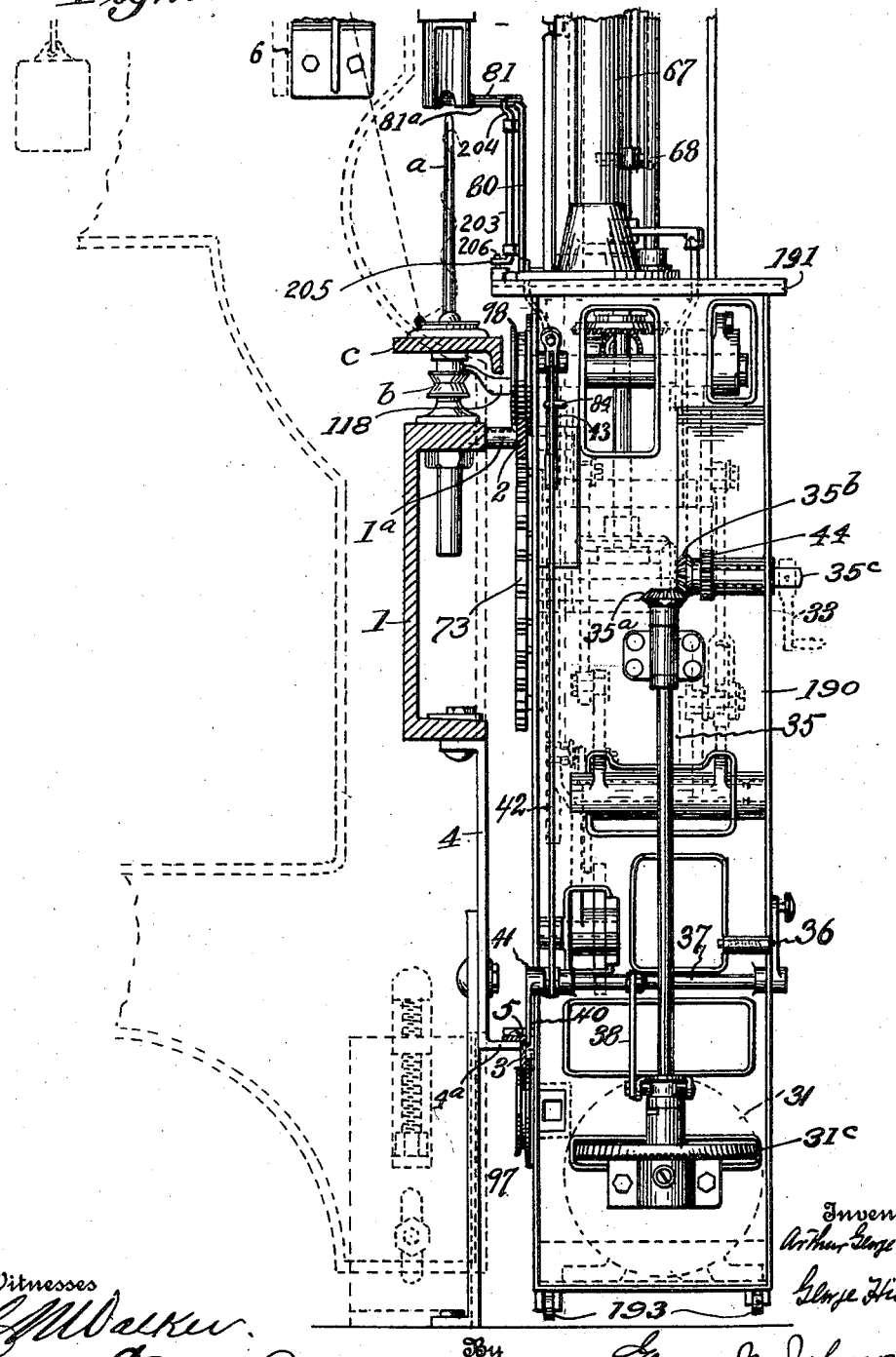

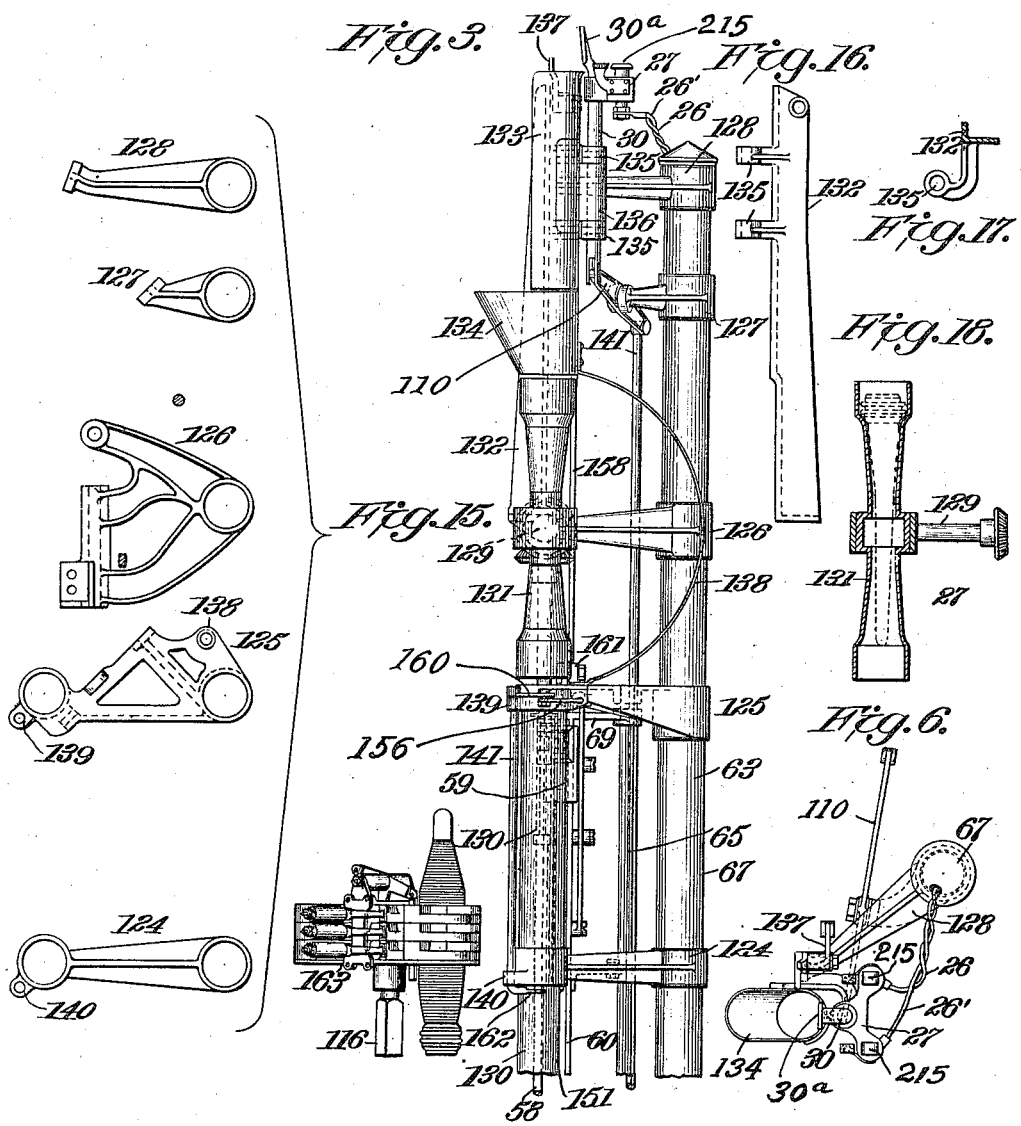

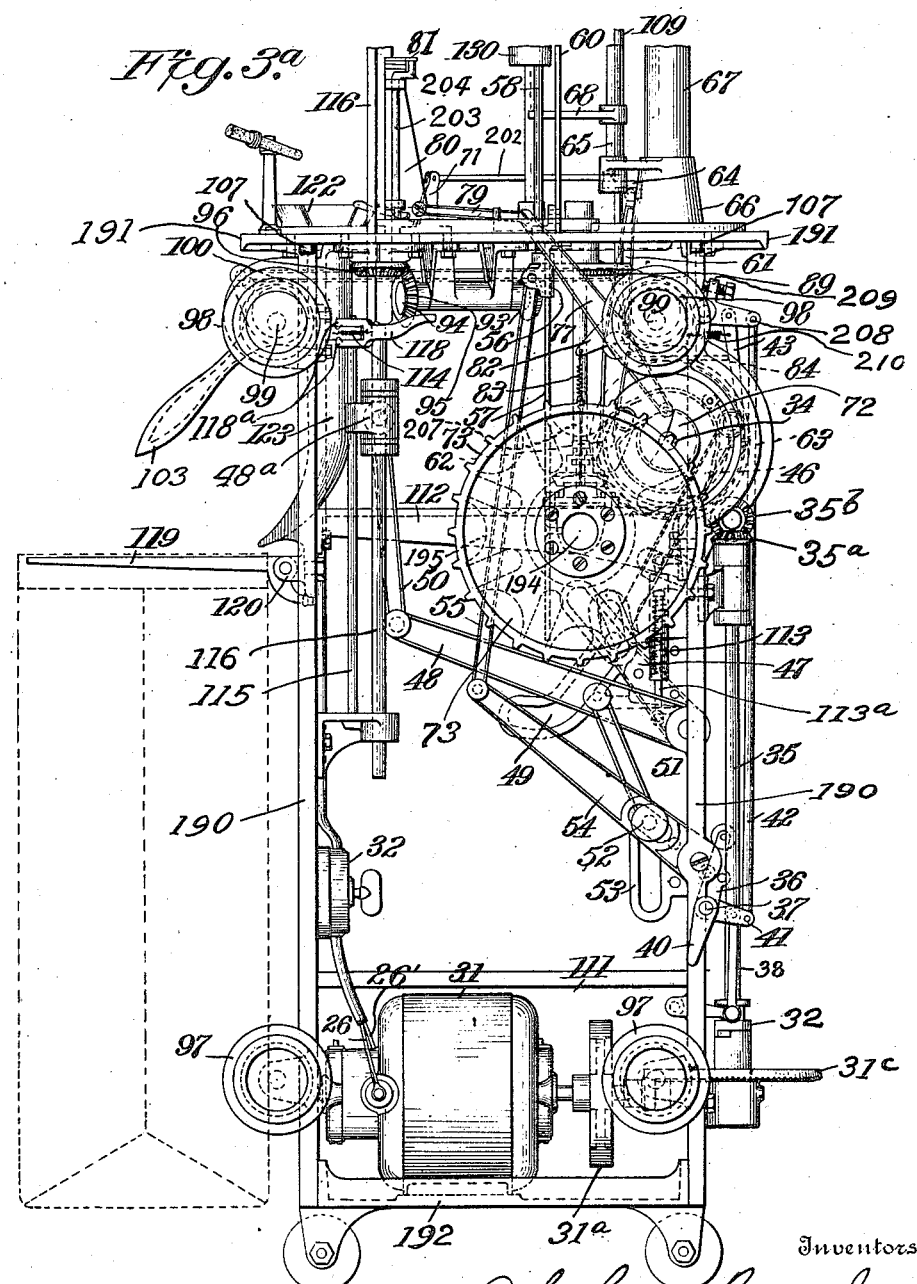

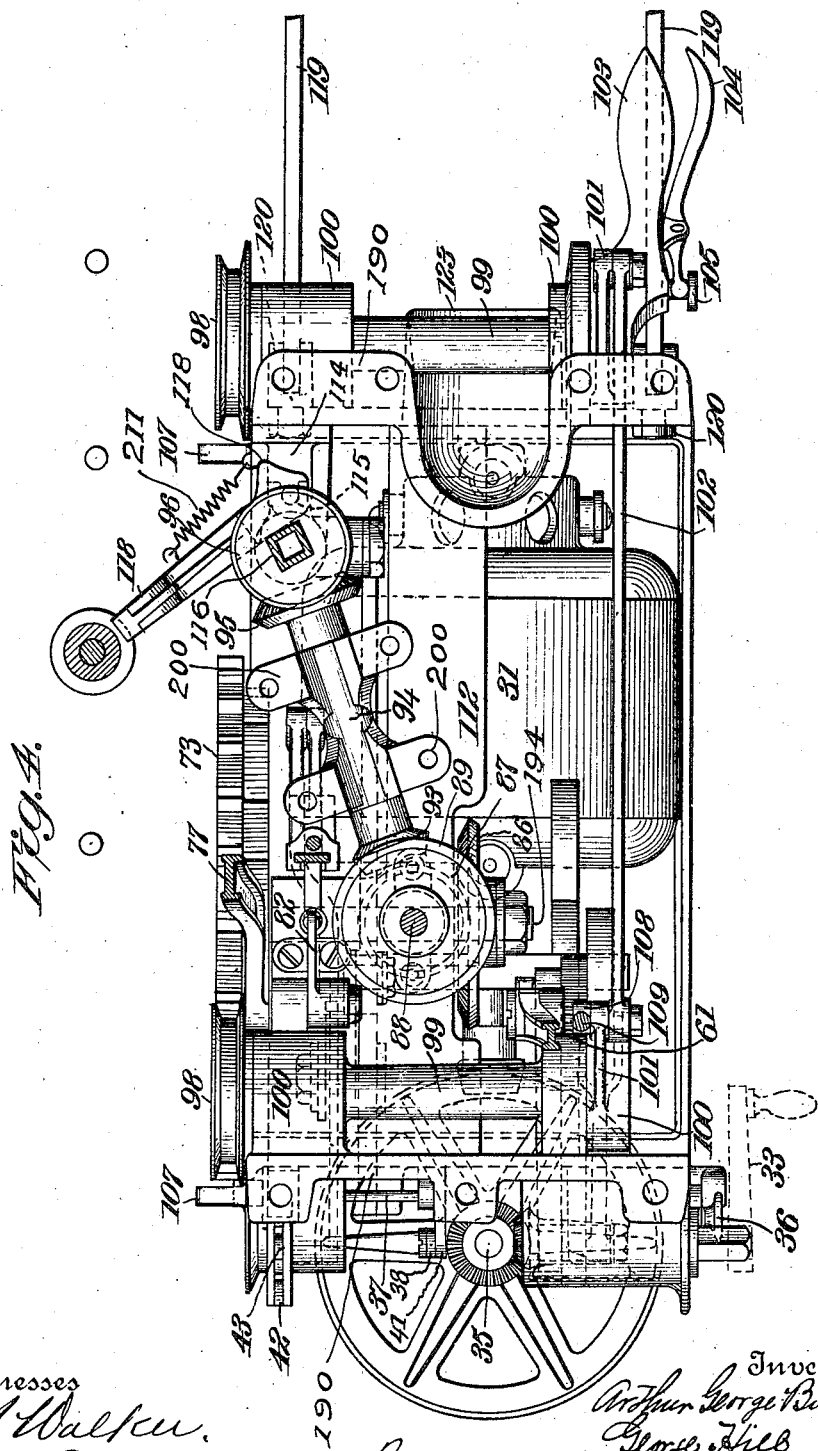

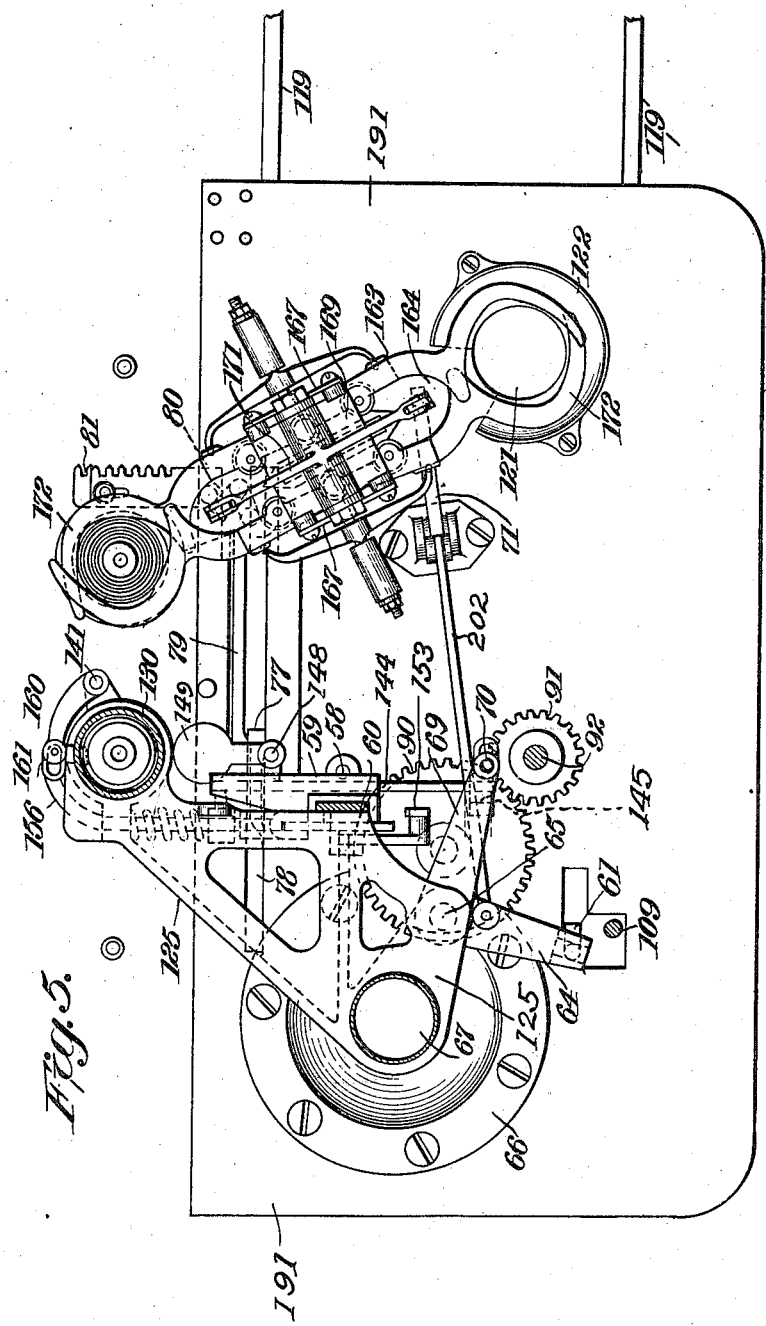

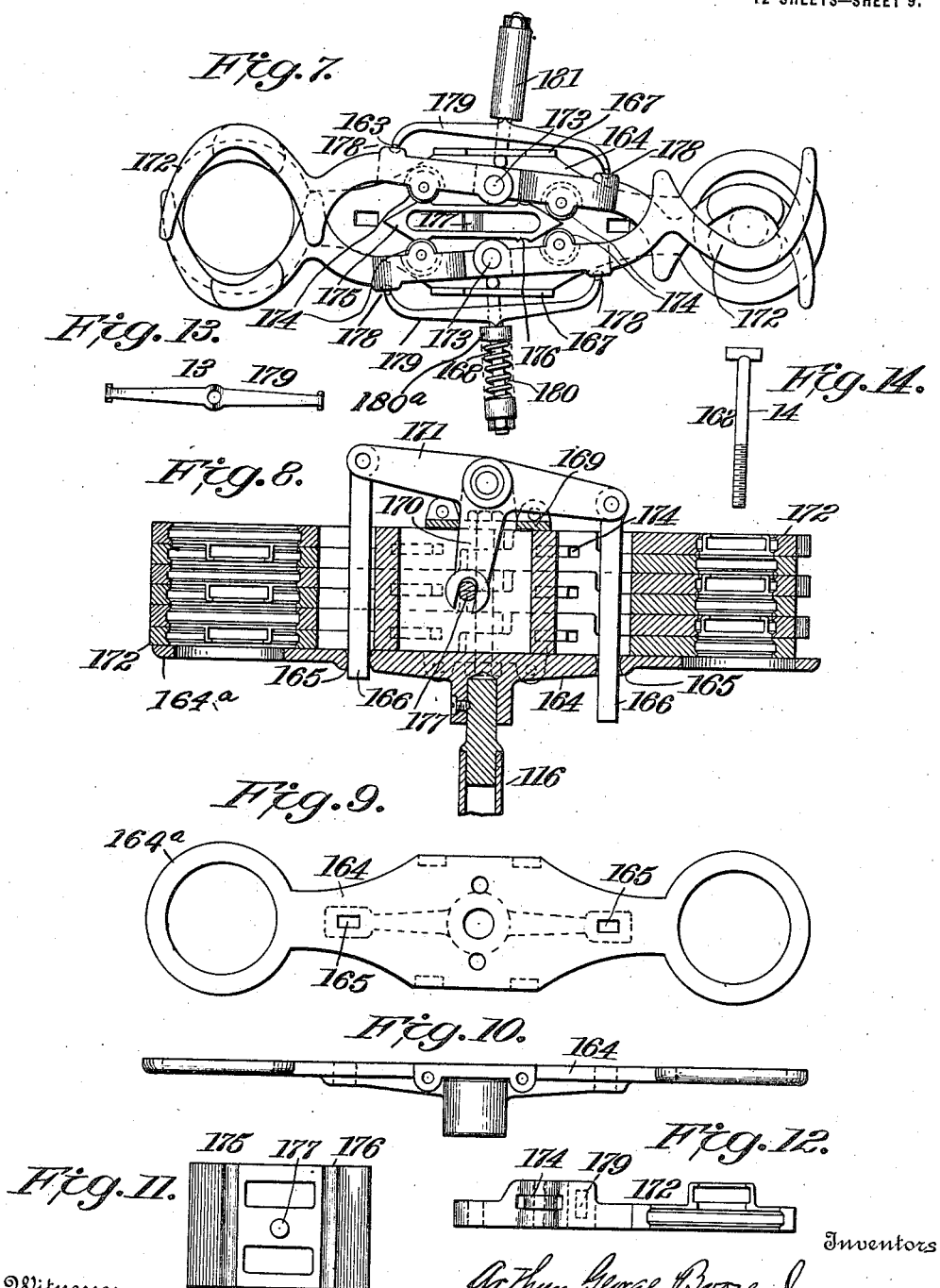

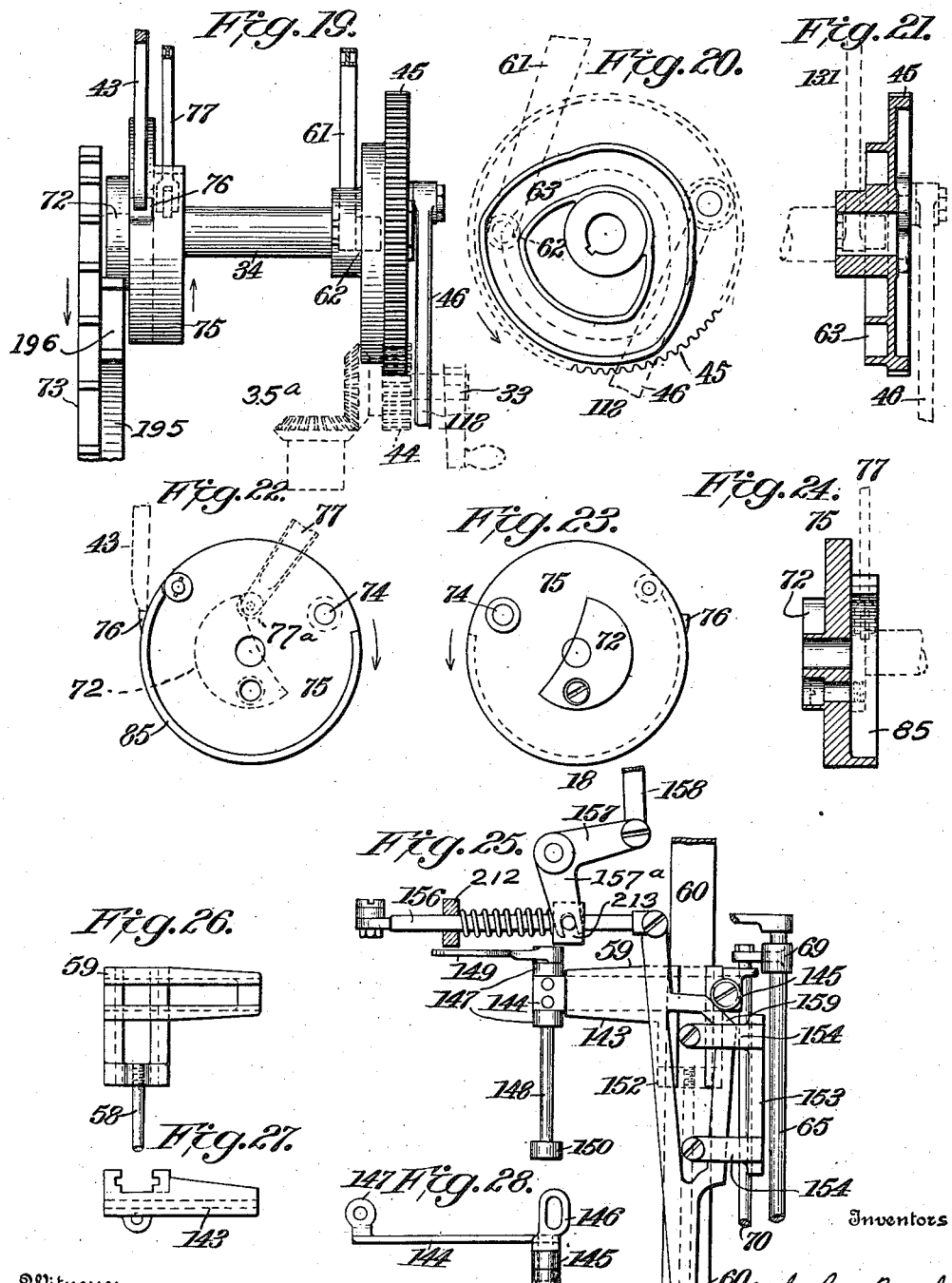

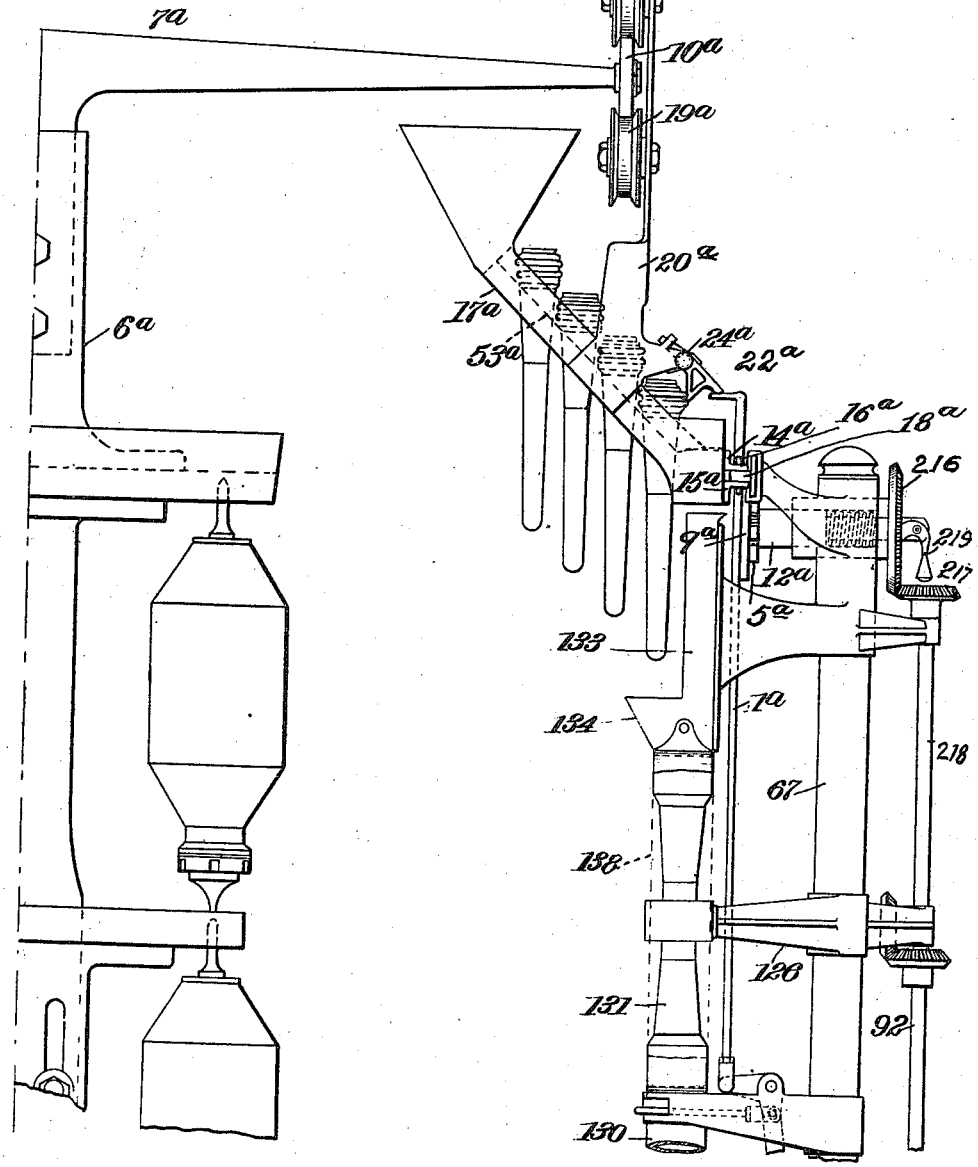

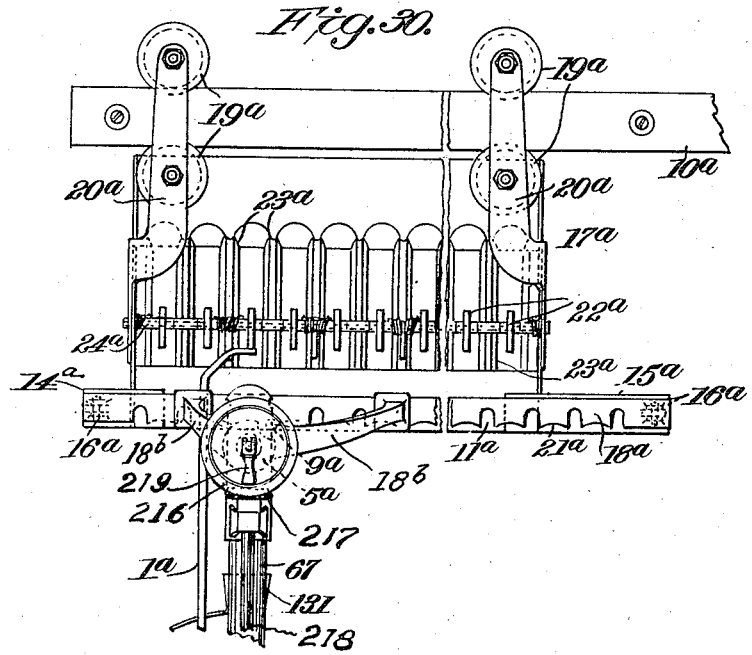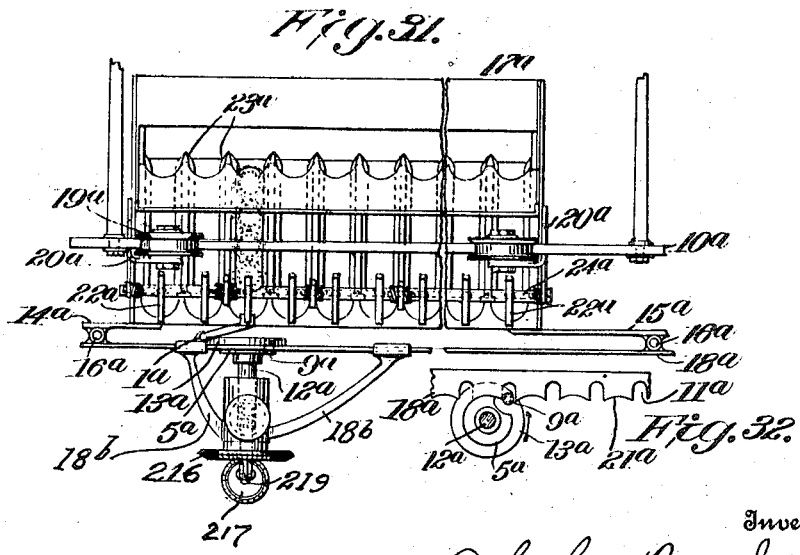

ARTHUR GEO. BOOZER, JR., AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFING-MACHINE FOR SPINNING-FRAMES.

1,142,013.      Specification of Letters Patent.      Patented June 8, 1915.

Application filed April 15, 1911. Serial No. 621,317.

*To all whom it may concern:*

Be it known that we, ARTHUR GEORGE BOOZER, Jr., and GEORGE HILL, citizens of the United States, residing at Tucapau, in the county of Spartanburg and State of South Carolina, have invented certain new and useful Improvements in Doffing-Machines for Spinning-Frames, of which the following is a specification.

The invention set forth in this application appertains to improvements in doffing machines for spinning frames, the object being to provide an automatic or power driven mechanism for rapidly, accurately and successively removing filled bobbins from the spindles of spinning machines, severing the thread or yarn between the raised bobbin and the spindle, and then placing upon the empty spindle an empty bobbin, the full bobbins that have been doffed being deposited into a receptacle carried by the doffer.

A doffing machine made to accord with our invention is designed to be maintained in movable engagement with the spinning frame and to travel from one end of the frame to the other end, without the intervention of manual assistance and during its travel which is intermittent to raise the filled or partially filled, or even empty bobbins from the spindles of the spinning frame, sever the thread when the bobbin has been raised above the spindle and then place an empty bobbin properly upon the spindle, these operations being effected while the doffer is at rest, and is held in fixed or non-movable engagement with the spinning frame. The empty bobbins are supplied to the doffer from a magazine mounted upon the spinning frame, which magazine is adapted to carry a sufficient number of empty bobbins to supply one side of the frame.

A machine of the character shown wherein the movements are rapid and where there is a positive drive, as by a motor mounted upon the doffer, or other power driving means as a belt or rope drive actuated by power applied to the spinning frame, it is desirable and practically essential that some automatic means should be provided, whereby in the event of any of the parts failing to properly perform their function or functions there will be an immediate stoppage of the doffing machine and its parts, in order to prevent injury either to the doffing machine, the bobbins or the spindles, such means also being effectively actuated by manual operation and by engagement with a fixed part on the spinning frame for automatic actuation when the doffing machine reaches the end of a frame.

To meet the commercial requirements of an automatic or power driven doffer the essential characteristics are accuracy in operation, freedom from liability of injuring the bobbins or the spindles, speed in operation, portability and lightness in structure the least possible encroachment upon the aisle space, a non-interference with the operative parts of the spinning frame, and ease of attachment to the spinning frame and removal therefrom for use upon another frame. These requirements we have accomplished by a construction wherein the bobbin-removing and the bobbin-placing means operate in vertical alinement with the spindles, and during a period when the carriage is held in non-movable or locked engagement with the spinning frame, and should there be a failure, as the non-removal of a filled bobbin from a spindle or an improper placing of an empty bobbin on the spindle, the drive will be at once disassociated from the doffer and an immediate stoppage of the doffer mechanism or travel of the carriage will be effected.

The doffing mechanism illustrated by the accompanying drawings is designed as an improvement upon the machines shown in our prior and copending applications filed November 8, 1907, March 16, 1909 and March 22, 1909, and the drawings in the present application show the different parts in the position that they will occupy when the bobbin has been removed from the spindle and the thread or yarn has been cut and at a position where the upward movement of the doffer-head is retarded at which position the travel of the doffer along the spinning frame commences.

In the accompanying drawings Figures 1 and 1ª constitute a front elevation of our improved doffer for spinning frames, a portion of the spinning frame being shown in dotted lines. Figs. 2 and 2ª constitute an end elevation, the bolster rail and the ring-rail of the spinning frame and the magazine for the empty bobbins being shown in section. Fig. 2ᵇ is a detail view projected from Fig. 2. Fig. 2ᶜ is a fragmental detail view of parts shown in Fig. 2. Figs. 3 and 3ᵃ constitute a rear elevation of the doffing machine, showing the same detached from the spinning frame. Fig. 4 is a horizontal section taken immediately below the platform or table of the doffer, on the line 4 4, Fig. 1ᵃ. Fig. 5 is a horizontal section taken in the plane of line 5 5 of Fig. 2, above the table and the doffer-head and looking downward. Fig. 6 (Sheet 5) is a plan view of those parts which are located above the plane of the doffer head. Fig. 7 is a plan view of the doffer head, a portion thereof being removed. Fig. 8 is a vertical longitudinal section through the doffer head. Fig. 9 is a plan view of the base plate of the doffer head. Fig. 10 is a side elevation of the base plate of the doffer head. Figs. 11, 12, 13 and 14 are detail views of parts of the doffer head. Fig. 15 (Sheet 5) shows plan views of several brackets or supports which are attached to an upright or standard of the doffing machine. Figs. 16 and 17 are detail views of a support attached to brackets maintained by said upright or standard. Fig. 18 is a sectional view of bobbin-inverting means. Fig. 19 is a side elevation of the main actuating shaft and parts associated therewith. Fig. 20 is a detail view of a gear crank and cam that is attached to the front end of said main shaft. Fig. 21 is a sectional view of the gear shown by Fig. 20. Fig. 22 is a front elevation of a part on the main actuating shaft. Fig. 23 is a rear elevation of the part shown by Fig. 22. Fig. 24 is a vertical section of the part shown by Figs. 22 and 23. Fig. 25 is a detail view showing parts of the bobbin placing mechanism. Figs. 26, 27 and 28 are detail views of parts shown by Fig. 25. Fig. 29 is an end elevation showing a modification, wherein the magazine for empty bobbins is maintained in movable engagement with the spinning frame. Fig. 30 is a front elevation of the magazine shown by Fig. 29. Fig. 31 is a plan view of the magazine and parts shown in Fig. 30, and Fig. 32 is a detail view of means for intermittently moving the magazine.

The embodiment of our invention which we have herein illustrated comprises a rectangular framework consisting of sides 190, a table 191 carried by the upper ends of said sides, a base 192 connecting the lower ends of said sides and cross-bars 111 and 112 extending between the sides. This framework is arranged to be mounted upon the spinning frame for traveling movement longitudinally thereof by means of upper rollers 98 and lower rollers 97 attached to the rear side of the framework, said upper rollers being grooved to engage and rest upon a bar 2 suitably secured to the upper flange of the bolster rail 1 of the spinning frame. Spacing sleeves 1ᵃ may be used to space the guide rail 2 the proper distance from said bolster rail. The lower pair of rollers 97 are grooved to engage the lower edge of a guide bar 3 which is carried by an angular flange 4ᵃ upon each one of a series of brackets 4, said brackets being attached at their upper ends to the lower flange of the bolster rail 1, and having their lower ends bearing upon the floor. Preferably the brackets comprise overlapping sections, and the length of each bracket may be adjusted to unevenness in the floor by means of a bolt extending through an opening in one of the bracket sections and through a slot in the other section. When the rollers 97 and 98 are in engagement with their guide rails the supporting rollers 193 which are carried by the lower end of the framework are clear of the floor.

The upper supporting rollers 98 are fixed upon shafts 99 which are rotatably mounted in eccentric supports 100. (See Figs. 1ᵃ, 3ᵃ and 4.) These eccentric supports are rotatably mounted in suitable bearings on the framework and each has a projection 101 thereon, which projections are connected together for simultaneous movement by means of a link 102. A handle 103 fixed with relation to one of the supports 100 is arranged to rotate both of the supports to raise and lower the framework off the floor when the upper rollers have been associated with the upper guide rail 2. A hand lever 104 engages a spring-actuated locking pin 105 which is arranged to enter suitable locking recesses to hold the eccentric supports in their adjusted position. When the doffer is being removed from the spinning frame, projections 107 (Figs. 3ᵃ and 4) come into engagement with the guide rail 2 as the framework is lowered, said projections supporting the machine so that the rollers 97 and 98 may be freed from their guide rails and the doffer may be lifted off.

The spinning frame is of the usual construction comprising the spindles *a* mounted in the bolster rail 1 and having whirls *b* (see Fig. 2ᵃ) fixed thereon for rotating them.

*c* indicates the ring-rail of the spinning frame.

The means for feeding the doffer step by step along the spinning frame comprises a toothed wheel 73, the teeth of which are arranged to engage notches 2′ in the lower edge of the guide bar 2 when the doffer is associated with the supporting frame. The wheel 73 is fixed on the rear end upon a horizontal shaft 194 rotatably mounted in the cross-bar 112, said wheel having fixed with relation thereto a star wheel 195 (Figs. 1ᵃ and 3ᵃ) having a series of relatively deep notches 196 in its periphery and also intermediate arcuate recesses 197. The main actuating shaft 34 of the machine is mounted in a suitable bearing in the framework and has fixed to one end thereof a cam member or disk 75 (illustrated in Figs. 19, 22 and 23), said member carrying a roller stud 74 arranged to enter the successive notches 196 in the star wheel 195 to intermittently rotate the toothed wheel 73. A segmental boss 72 on the cam member 75 is arranged to fit and turn in the arcuate recesses 197 in the star wheel during the periods when the roller stud 74 is not in engagement with one of the notches 196, (see Fig. 3ᵃ) so that the star wheel 195 and the toothed wheel 73 will be locked against movement between the periods of their actuation.

The main drive shaft 34 is arranged to be driven in the present instance by means of an electric motor 31 mounted on the base 192 of the supporting frame. The shaft of the motor preferably has a fly wheel 31ᵃ fixed thereon and said shaft also carries a bevel pinion 31ᵇ which meshes with a bevel gear wheel 31ᶜ rotatably mounted upon the lower end of a vertical shaft 35 which is mounted in suitable bearings on one of the sides of the framework. The upper end of the shaft 35 carries a bevel pinion 35ᵃ which meshes with a similar pinion 35ᵇ carried by a horizontal stub shaft 35ᶜ, as best shown in Fig. 2ᵃ. Upon this stub shaft is fixed a pinion 44 which meshes with a gear wheel 45 fixed upon the main actuating shaft 34. (See Fig. 19.) The end of the stub shaft 35ᶜ is arranged to receive a crank 33 for rotating the shaft 34 by hand.

Clutch means is provided for connecting the motor to the shaft 35ᵃ, the means for this purpose which is herein shown comprising a clutch hub 31ᵈ upon the bevel gear wheel 31ᶜ, said hub being arranged to be engaged by a clutch collar 32 slidably but non-rotatably mounted upon the shaft 35. A horizontal rock shaft 37 (Figs. 1ᵃ, 2ᵃ and 3ᵃ) is mounted in one of the sides 190 of the framework, said shaft having an arm thereon which is connected through a link 38 with pivoted jaws 39 engaging the clutch collar 32. The shaft 37 may be manually rocked to engage and disengage said clutch collar by means of a frictionally held hand crank 36 upon one end thereof. Said shaft 37 also has fixed thereon a depending arm 40 which is arranged to be engaged and rocked by a stop 5 fixed upon the lower guide rail 3 at one end of the spinning frame. Thus when the doffer reaches the end of the spinning frame, the motor will be automatically disconnected from the machine. Upon the shaft 37 is fixed an arm 41 to which is attached the lower end of a link 42, the upper end of said link being connected with mechanism arranged to be actuated in case the doffer fails to perform one of its functions, as, for example, fails to remove a bobbin from a spindle. This latter mechanism will be later described.

The bobbins are doffed by a doffing head best shown in Figs. 5 and 7 to 12, said doffing head comprising two oppositely extending bobbin-engaging devices. The doffing head is arranged to have a vertical reciprocating movement to pass downwardly over a filled bobbin and raise it from its spindle, and said head also has a rotary movement to carry the filled bobbin in one of the gripping devices above a discharge chute and at the same time carry the other gripping device of the head above the succeeding bobbin to be doffed. This doffing head, as shown in Fig. 8, comprises a horizontal base plate 164, sides 167 and a cross-plate 169 connecting the upper edges of said sides. The base plate 164 has annular portions 164ᵃ at opposite ends thereof which are arranged to encircle a filled bobbin when the head descends. The lower edges of these annular portions are preferably rounded so that said portions will engage the thread running to the bobbin and move it to one side so that it will not be engaged by the gripping devices. Pivoted upon a pair of vertical pins 173 mounted in the base plate 164 and the top plate 169 are two pairs of gripping jaws 172. These pairs of jaws extend in opposite direction from their pivots, and each comprises a plurality of superimposed and independently pivoted fingers, the fingers being alternately arranged upon the respective pivot pins 173 so that the fingers of each pair of jaws at opposite sides of said pivot pins will intermesh, as clearly shown in Fig. 7. The jaws carry antifriction rollers 174 at their inner sides and these rollers are arranged to be engaged by a horizontally reciprocable member 175 (Fig. 11) positioned between the jaws and having wedge-shape ends. As this member is reciprocated, one end thereof will be moved between the rollers of one pair of jaws to spread said jaws apart, the opposite end of said reciprocable member being withdrawn from between the rollers on the jaws to permit said jaws to be closed, by means to be presently described. The wedge member 175 is guided between the base 164 and top 169. When the member 175 is moved into full position between the antifriction rollers, said rollers lie in recesses 176 in said member. An elongated opening extends vertically through the member and runs substantially from end to end thereof. Pivoted on a pair of ears upon the top plate 169 is a three-arm lever 171, the middle depending arm of said lever passing through a slot in said top plate and into the elongated opening in the wedge member, said arm having a notch in its lower end to embrace a pin 177 mounted in the wedge member crosswise of said opening, so that when the lever 171 is rocked, said member 175 will be reciprocated. The ends of the horizontal arm of the lever 171 have attached thereto links 166 which extend downwardly through openings 165 in the base plate. The lower ends of said links are alternately engaged by means to be later described to raise the links and rock the lever 171. A series of bolts 168 have their heads engaging in openings in the side walls 167 of the doffer head, and upon each of these bolts is mounted for free sliding and rocking movement a spanner bar 179, the opposite ends of each of said bars being arranged to engage in recesses 178 in two adjacent oppositely extending fingers of the jaws 172 at one side of the doffer head. (See Figs. 3 and 7). These spanner bars are pressed inwardly by coiled springs 180 surrounding the bolts 168 and bearing at their inner ends against collars 180ª which engage the mid-portions of said spanner bars. Preferably the springs 180 and collars 180ª are inclosed by housings 181. As indicated in Fig. 7, the spanner bars having knife-blade edges or pivots against which the collars 180ª bear, so that said spanner bars will be free to rock. As will be seen when the reciprocable member 175 is moved to withdraw its end from between one pair of the jaws, the springs 180 will force the adjacent ends of the spanner bars 179 inwardly to close this pair of jaws, the opposite pair of jaws being held open by said reciprocable member. Since the fingers of the gripping jaws are independently pivoted and independently pressed by the spanner bars 179, the fingers are free to adjust themselves to the surface of the bobbins, whether the bobbins be full, or only partially or unevenly wound, or empty, so that the jaws will obtain the most efficient grip upon the bobbins.

The bobbins removed from their spindles by the doffing head are released by said doffing head above an opening 121 through the table 191, said opening being surrounded by a flaring guide 122. Beneath the opening 121 is a guide chute 123 arranged to direct the falling bobbins into a suitable receptacle provided for that purpose. In the present instance, we have shown a bag carried upon a pair of arms 119 which are pivoted to the framework adjacent to the lower end of the chute 123. If it is desired to move these arms out of operative position, they may be raised upon their pivots to disengage projections carried thereby from their coöperating recesses, and the arms may then be given a slight twist and dropped down to hang along one of the sides of the framework, as indicated in dotted lines in Fig. 1ª. The arms 119 extend longitudinally of the spinning frame so as not to encroach upon the aisle space.

The doffer head is mounted upon the upper end of a doffer bar 116 which is vertically slidable through the table 191, the lower end of said bar being slidably mounted in a bracket 117 carried by the framework. The means for vertically reciprocating this doffer bar 116 comprises a two-arm lever 47 48 which is pivoted at 47ª in the framework. The long arm 48 of the lever 47 is connected by means of a link 50 to a sleeve 48ª mounted upon the doffer bar 116 between two fixed collars thereon, said sleeve permitting rotation of the doffer bar. The shorter arm 47 of this lever has a slot therein in which travels a pin carried by one end of a link 46, the opposite end of said link being pivoted upon a wrist pin 198 fixed in the forward face of the gear wheel 45 upon the main actuating shaft 34. As will be seen, when the gear wheel 45 rotates, the doffing head will be moved up and down.

In order to counterbalance the lever 48 there is provided a coiled spring within a housing 113 attached to the framework, said spring being arranged to be compressed by a pin 113ª attached to the lever 48. When said lever is in its lowest position said spring will be fully compressed so that its full force will be exerted upon the lever in its initial upward movement to raise the doffing head. The operation of the parts is so timed that the full power of the motor 31 will be utilized to lift the doffing head, the remainder of the mechanism being stationary while the doffing head is being raised to lift a bobbin from a spindle. In order that the doffer bar 116 shall be stationary for a suitable length of time when in its upper and lower positions there is provided a member 49 fixed in the frame-work and having a cam slot therein into which slot the pin on the link 46 extends. Said slot has an inclined middle portion and end portions shaped to allow said pin to move in the slot in the arm 47 when the rod 116 is at or near its upper and lower positions.

Rotary movement is imparted to the doffing head by the following means: A vertical shaft 88 has its ends mounted in bearings in the table 191 and the cross-bar 112, and upon the lower end of said shaft is a bevel gear 87 which meshes with a similar gear 199 upon the shaft 194 which carries the toothed driving wheel 73. The upper portion of the shaft 88 has mounted thereon a bevel pinion 87 which meshes with a pinion 93 fixed upon one end of a short horizontal shaft 94. This shaft 94 is mounted in a depending bearing bracket 200 fixed to the under side of the table 191. The other end of the shaft 94 carries a bevel gear 95 which meshes with a bevel gear 96 rotatably supported at the under side of the table and having a non-circular opening therein through which the rectangular portion of the doffing bar 116 slides, as shown in Fig. 4. Intermittent rotary movement is imparted to the shaft 194 from the main shaft 34 through the cam sector 72 and star wheel 195 and from the shaft 194 this intermittent rotation is transmitted to the doffer bar 116 through the means above described.

The upper portion of the mechanism of the machine is supported by an upright tubular standard 67 rising from the table 191, the lower end of said standard being seated in a base 66 fixed to the table. A vertical rock shaft 65 has its lower end mounted in a bearing lug 201 (Fig. 1a) upon the base member 66, and upon said rock shaft is fixed an arm 64 having attached thereto one end of a horizontal link 202. The other end of said link is attached to the upright arm of a bell-crank lever 71 (Figs. 1a and 5) pivoted in a bearing upon the upper face of the table 191. The horizontal arm of said bell-crank lever extends into position to underlie the depending links 166 of the doffer head as said links are moved alternately into position. The arm 64 is arranged to be swung to actuate the links 166 of the doffer head by means of an upright lever 61 pivoted in the supporting framework and having its upper arm extending through an opening in the table 191 and inter-engaging with the end of the arm 64. The lower end of the lever 61 carries a roller stud 62 arranged to run in a cam groove 63 (Fig. 20) upon the inner or rear face of the gear wheel 45 upon the main actuating shaft. The parts associated with the main shaft 34 are shown in Fig. 19. The contour of the cam groove 63 is such that the bell-crank 71 will be rocked at the proper time to actuate the gripping means of the doffer head.

After a bobbin has been raised off its spindle, the thread running from the bobbin to the spindle is severed. The means for cutting this thread comprises an upright support 80 which is horizontally slidable in suitable guideways upon the table 190, and carries at its upper end a stationary shear blade 81 and a coöperating slidable shear blade 81a, said blades being positioned in a horizontal plane such that they will freely clear the upper ends of the spindles and bobbins thereon, but will be engaged by a bobbin unless it is fully seated upon its spindle. Suitable means for sliding the movable shear blade may be provided, that herein shown comprising a vertical rock shaft 203 (Fig. 2a) carried by the support 80, the upper end of said shaft having a crank arm 204 engaging the slidable shear blade 81a and the lower end of said shaft having a crank arm 205 arranged to be moved into engagement with an upright projection or pin 206 fixed in the guideway for the support 80. Thus when the support has been slid to a position slightly beyond the spindle from which a bobbin has just been doffed, the pin 206 will actuate the shear to sever the thread running from the bobbin to the spindle. The support 80 is arranged to be slid by means of a lever 77 pivoted intermediate its ends in the framework, the upper end of said lever extending through a slot 78 in the table 191 and being connected by a link 79 with said support 80. The lower end of the lever 77 carries a roller stud 77a which is arranged to be engaged by a segmental flange 85 upon one face of the cam member 75. An arm 82 on the lever 77 (Fig. 3a) has attached thereto a coiled spring 83 which is secured to a rod 207 passing through a lug on the cross-bar 112, the lower end of said rod having a nut threaded thereon beneath said lug for adjusting the tension of the spring 83. This spring tends to swing the lever 77 to place the thread-shearing device in its operative or projected position, but the segmental flange 85 upon the cam member 75 engages the roller stud upon the lever 77 and holds said lever with the thread-shearing device out of its operative position. When the roller stud 77a rides off said segmental flange, which occurs just after a bobbin is doffed, the lever 77 will be quickly swung by the spring 83 to project the shearing device between the lower end of the doffed bobbin and the upper end of its spindle, and the rock shaft 80a will be actuated by the pin 206 to operate the shear and sever the running thread. As the cam member 75 continues to rotate, the lever 77 will be engaged by an antifriction roller on said cam member at one end of the segmental flange 85, and said lever will be swung until its roller finally rides up on the flange 85.

In case the doffing head has failed to fully remove a filled bobbin, or an empty bobbin has not been properly seated upon the spindle, it is desirable to automatically stop the doffer. The mechanism for accomplishing this result comprises a horizontal bar 84 (see Figs. 2a and 3a) carried by the lever 77 and extending slidably through an opening in one of the sides of the framework. An arm 208 pivoted upon the framework has its outer end connected by means of the link 42 to the clutch-operating mechanism previously described. Preferably said arm is provided with a lug 209 in which is mounted an adjusting screw which bears against the framework. A dog 43 is pivoted at its upper end to the mid-portion of the arm 208, the nose of said dog being arranged to engage a projection 76 upon the periphery of the cam member 75. Said dog is normally held in its engaging position by means of a coiled spring 210. The outer end of the bar 84 carried by the lever 77 is arranged to engage the dog 43 and move it out of operative position. When the doffer is operating properly said dog will be moved out of operative position at each swinging movement of the lever 77 so that the dog will not engage the lug 76 on the cam member 75. However, in case of failure of proper actuation, as above mentioned, the thread-shearing device will come into engagement with the improperly positioned bobbin and consequently the lever 77 will be held against swinging movement to project the bar 84 and move the dog out of operative position. Therefore when the lug 76 again comes into relation with the dog, said dog will be engaged and moved upwardly to raise the link 42 and thus disengage the clutch collar 32 and stop the machine.

An arm 54 is pivoted in the lower portion of the framework, said arm being connected with the doffer-head-raising lever 48 by means of a link 51, the lower end of said link having a roller stud 52 which runs in a slot in the arm 54 and in a slot in a stationary cam 53 mounted in the framework. The slots in the arm and in the cam 53 are arranged to register when the arm is in its uppermost position. To the outer end of the arm 54 is attached a vertically extending link 55, the upper end of which link is connected to a slide head 56 mounted for reciprocation upon a vertical guide bar 57, said bar being secured to the table 191 and to the cross-bar 112 respectively. The lower end of a rod 58 is attached to the slide head 56, the upper end of said rod being arranged to operate means for controlling the feeding of empty bobbins to be placed upon the spindles. This means will be later described.

To prevent the withdrawal of a spindle from the spindle-bolster, the doffer frame is provided with a projection 114 (Figs. 3ª and 4) that may also serve as a support for the upper end of a guide rod 115 along which the sleeve 48ª upon the doffer rod 116 slides, the lower end of the rod 115 being seated in the bracket 117. A whirl-engaging member 118 (Fig. 4) embraces the projection 114 and is pivoted upon the bar 115. Movement in one direction of the whirl-engaging member is limited by a stop portion 118ª that overlies the projection 114. A spring 211 attached to the projection and to the part 118 permits such part to swing and pass the spindles as the doffer is moved along the spinning frame. The part 118 is of such a length as to overlie the whirl of the spindle from which a bobbin is being doffed, and will effectively prevent the withdrawal of the spindle from the bolster should the usual catch be inoperative.

The tubular standard 67 has mounted thereon a plurality of brackets 124 125 126 127 128, these brackets being shown in detail plan view in Fig. 15. The vertical guide tube for empty bobbins to be placed on the spindles is mounted in the lower brackets 124 and 125. Above the upper end of this guide tube is rotatably mounted a device adapted to receive bobbins in an inverted position from the empty bobbin magazine and turn the bobbins right side up for transmission to the guide tube 130. This inverting device is best shown in Fig. 18 and comprises a shaft 129 rotatably mounted in the bracket 126 and carrying a sleeve 131 which is open at both ends to receive a bobbin. A semi-circular guide plate 138 is arranged to prevent the bobbins from falling out of the inverter while in motion. The inverter is intermittently rotated by a vertical drive shaft 92 (see Fig. 2), having a miter gear at its upper end which meshes with a similar gear upon the inverter shaft, the drive shaft 92 having a pinion 91 at its lower end which meshes with a pinion 90 (Fig. 1ª) upon the upper end of the vertical shaft 88 above the table 191. An upright 132 is carried by the brackets 126 and 128, said upright having secured thereto a guide 133 having a funnel portion 134 at its lower end and above the inverter tube 131. The guide 133 extends in position directly beneath the bobbin magazine to be presently described.

A vertical guide bar 60 (Figs. 2, 3, 5 and 25) has its lower end secured to the table 191 and its upper end secured in the bracket 125. Upon this guide bar is slidably mounted a crosshead 59 which is attached to the upper end of the rod 58. In a horizontal guideway 143 in this crosshead is mounted a slide 144 having at its forward end a roller stud 145 and a slotted extension 146 (Fig. 28), the rear end of said slide having a bearing 147 thereon. In this bearing is mounted a vertical pin 148 having at its upper end a bobbin seater 149, the lower end of said pin having a head 150 which acts as a stop and also as a weight for the bobbin seater. If desired the pin 148 may be encircled by a coiled spring as shown in our prior application Serial No. 401,308, filed November 8, 1907. The bobbin seater 149, as shown in the plan view in Fig. 5 comprises a circular head and a reduced neck portion which is fixed on the pin 148. A vertical rod 70 carried by arms 68 and 69 upon the vertical rock shaft 65 extends through the slot in the extension 146 on the slide 144 so that when the rock shaft 65 is rocked by the lever 61 and arm 64 as hereinbefore described, the slide 144 will be moved forward and back. The upper end of the rock shaft 65 is mounted in the bracket 125. Pivoted upon the guide 60 is an arm 152 having a cam surface 159 thereon against which the roller 145 rides. To the guide 60 is also secured a stationary guide 153 by means of arms 154. The roller 145 travels between the vertical portion of this guide and the arm 152 in its downward movement. Pivotally attached to the upper end of the arm 152 is a rod 156 which is slidably mounted in a bearing 212 in the bracket 125. Upon this rod is a collar 213 having a pin arranged to be embraced by the notched arm 157ª of a bell-crank 157, which is pivoted on the bracket 125 and is connected by means of a link 158 with means to be presently described for operating the bobbin-releasing devices of the empty bobbin magazine. Between the collar 213 and the bearing for the rod 156 is a coiled spring surrounding said rod 156 and tending to maintain it in its forward position. The rear end of said rod is curved, as shown in Fig. 5, to lie at the rear side of the guide tube 130. Said rod is connected by a pin and slot connection with an arm 160 fixed upon the upper end of a vertical rock shaft 141, which extends alongside the guide tube 130 and has its ends mounted in bearings in the brackets 124 and 125. (See Fig. 3). The free end of the arm 160 has a projection or stop 161 which extends through the wall of the tube 130 and normally supports a bobbin in the inverter tube 131. Upon the lower end of said rock shaft is an angular stop 162 arranged to project through a horizontal slot in the guide tube and support another bobbin therein. When the rod 156 is slid rearwardly the projections or stops 161 and 162 are withdrawn from the guide tube to permit the lowermost bobbin therein to drop onto the empty spindle and to allow the bobbin in the inverter to descend in the guide tube.

The operation of this portion of the mechanism is as follows: When the crosshead 59 is in its upper position, the rod 70 will be swung by the rock shaft 65 to push the slide 144 rearwardly and project the head of the bobbin seater 149 into the guide tube 130 through a horizontal slot 130ª therein (Fig. 2). The neck portion of the bobbin seater will then be in alinement with the upper end of a vertical slot in the guide tube, and as the bobbin seater descends the neck will travel in said vertical slot. The rearward movement of the slide 144 brings the roller 145 thereon above the cam portion 159 of the arm 152, and as the crosshead 59 is drawn downwardly by the rod 58 the roller engages said cam portion and swings the arm rearwardly, or to the left, Fig. 25. In its further descent the roller travels between the stationary guide 153 and the arm 152. The rearward movement of the rod 156 operates the bell crank 157 and link 158 to release a bobbin from the magazine to drop through the guides 133 and 134 into the upper end of the inverter tube. The rod 156 in its rearward movement also withdraws the stops or latches 161 and 162 from the guide tube to permit the lower bobbin to fall on to a spindle and the upper bobbin to descend from the lower portion of the inverter tube, the latter bobbin falling onto the bobbin seater 149. At the lower end of the guide 153 the arm 152 is cut away and as the roller 145 passes this point, the spring 156ª swings the arm forwardly and projects the catches 161 and 162 into the guide tube. At this time the bobbin seater 149 is still above the lower catch 162. The head of the bobbin seater is made smaller than the butt of a bobbin so that the bobbin seater may pass the lower catch 162, but the bobbin supported on the upper side of the seater will be engaged and held by said catch. The bobbin seater now engages the bobbin which has just descended onto the spindle and firmly presses or seats the bobbin thereon. At this time the rock shaft 65 is rotated to carry the rod 70 and the slide 144 forwardly, thus withdrawing the bobbin seater from the tube through an opening therein for that purpose. As the crosshead 59 is carried upwardly the bobbin seater moves up at the outside of the tube 130, and the roller 145 passes at the forward side (right-hand, Fig. 25) of the guide 153.

The magazine for empty bobbins is supported upon the spinning frame by means comprising uprights 6, secured to the ends of the spinning frame, and braces 8 suitably spaced along the frame. The uprights 6 have extensions 7 thereon, said extensions and the braces 8 having bearings in which a horizontal shaft 10 is rotatably mounted, said shaft extending longitudinally along the spinning frame. Each side of the spinning frame is provided with a magazine and its supporting means, and the extensions 7 at each end of the spinning frame are connected by a cross-brace 9 (Fig. 2ᵇ). Upon the shaft 10 is fixed a sprocket wheel 11 and a plurality of sheaves 12. A bearing bracket 214 which is mounted for vertical adjustment on the standard 6, has a stub shaft 13 rotatably mounted therein, upon which shaft is fixed a sprocket wheel 14. A chain 16 runs over the sprocket wheels 11 and 14. The end of the shaft 13 may be squared or provided with a pin for interengagement with a crank for rotating said shaft. (See Fig. 2ᶜ). Upon the shaft 13 is also fixed a disk 15 having a notch in its periphery, in which notch a dog 18, pivoted upon the upright 6, is arranged to drop as will be later explained. The bobbin magazine 17 comprises an inverted trough-shaped member which is carried by the lower ends of a series of guide rods 20, said rods being slidable in bearings 8ª upon the braces 8, and having collars 19 fixed upon their upper ends for determining the lowermost movement of said rods. Rearwardly extending arms 21 upon the fixtures which connect the rods 20 to the magazine are arranged to be guided by suitable guideways upon the braces 8. Cables 22 secured to and arranged to be wound up by the sheaves 12, have their lower ends attached to ears on said fixtures so that when the shaft 13, and therefore the shaft 10, is rotated, the bobbin magazine will be raised. When the magazine is in its uppermost position the dog 18 will drop into the notch in the locking disk 15.

The construction just described provides means whereby the magazines may be lowered for use and for the purpose of supplying them with empty bobbins, as well as one which may be raised entirely above the creel board and out of the way of the operative parts of the spinning frame.

The lower edges of the bobbin magazine are provided with guide-ways upon which the bobbins are arranged to hang by their butts in inverted position. The guide at one side of the magazine consists of a rail 23 having a downwardly inclined edge to support the bobbins. The opposite side of the magazine is provided with a plurality of catches 29 which, when in their innermost position, form parts of an unbroken guide rail, but which are arranged to be withdrawn laterally to permit successive bobbins to escape from the magazine. To one side of the magazine is secured a strip 24 which provides convenient means for connecting to the magazine the springs for moving these bobbin-retaining catches inwardly.

The magazine is adapted to carry more than a sufficient number of empty bobbins to supply the spindles on one side of the frame. This is desirable because one of the bobbins may be defective or broken, or it may have its bore partially filled with yarn so that it cannot be properly placed upon a spindle. In such a case a bobbin will be taken from the magazine and placed in position by hand. Owing to the inclined inner edge of the magazine rail 23, a forward and downward pull upon a bobbin will release it from the magazine without actuating the spring-pressed catches mechanically. The magazine may be filled with bobbins from one end thereof either by hand or from any suitable carrier, and when the bobbin first inserted comes opposite a gage mark provided on the magazine, this will indicate that the magazine has been sufficiently filled. The catches 29 are arranged to be drawn out to release successive bobbins as the doffer moves along the spinning frame in the bobbin magazine, by means herein shown as comprising a bell-crank 137 (see Fig. 2) pivoted upon the upper portion of the upright 132, one arm of said bell-crank extending into position to engage the catches 29, the other arm thereof being connected to the upper end of the link 158 hereinbefore described.

In the present instance, in which the doffer is arranged to be driven by an electric motor, the bobbin magazine is made of insulating material and at the lower edges thereof are provided a pair of contact strips 28 29 connected with a suitable supply of electricity. The current is led from the contact strips 28 and 29 to the motor 31 by means of a pair of wires 26 26', said wires extending downwardly through the tubular standard 67 and having their lower ends connected with a switch 32 (Figs. 1ª and 3ª) mounted upon one of the sides 190 of the framework, said switch being connected with the motor 31. The upper ends of the wires 26 26' are electrically connected with a pair of contacts or brushes 215 mounted in an insulating cross head 27 (Figs. 1, 2, 3 and 6) carried upon the upper portion of a shaft 30. Upon the upper end of said shaft is a bobbin pusher 30ª which extends into the bobbin magazine and slides the bobbins along therein as the doffer advances. The brushes 215 move in engagement with the contacting strips 28 and 29. The shaft 30 is rotatably mounted in a sleeve 136 held between a pair of ears 135 upon the upper end of the upright 132 (Figs. 16 and 17). Said sleeve is provided with a quarter turn slot therein (shown in Fig. 2), and in this slot is arranged to travel a cross pin fixed in the shaft 30. The shaft 30 is arranged to be given a longitudinal movement by means to be presently described, and in this movement it will be turned a quarter turn by engagement of its cross pin with the slot in the sleeve 136. This will operate to swing the bobbin pusher 30ª and the cross head 27 longitudinally of the magazine and carry the brushes 215 out of engagement with the contact strips 28 and 29. The shaft 30 is arranged to be vertically moved by means of a lever 110 pivoted between its ends upon the bracket 127, one end of said lever being connected to said shaft and the opposite end of said lever being connected to the upper end of a link 109, the lower end of said link being connected with an arm or extension 108 upon one of the eccentric supports 100 for the upper supporting rollers 98 of the framework. Thus, when the framework is to be moved out of association with the spinning frame, the link 109 will be drawn downwardly to disconnect the brushes from the contact strips 28, 29 and permit the bobbin pusher 30ª to be withdrawn from the magazine.

Figs. 29 to 32 of the drawings show a different form of magazine and a slightly modified construction of the upper part of the doffer. To apply this form of magazine, the spinning frame has mounted thereon at each side supports 6ª that carry angular arms 7ª, said arms supporting a rail 10ª which extends longitudinally of the spinning frame. The magazine 17ª comprises a series of inclined bobbin compartments, each adapted to maintain a plurality of empty bobbins, in this instance four. The upper portion of the magazine is in the form of a V-shape trough 17$^b$, into which the bobbins are promiscuously deposited, and from which the bobbins pass into the inclined ways. The bobbin compartments or ways are formed by a series of parallel downwardly and forwardly inclined bars 23$^a$ suitably supported within the magazine. The trough 17$^b$ has openings in its lower portion of sufficient size to permit the butts of the bobbins to pass through onto the inclined rails 23$^a$. And the lower portions of said rails lead to openings of sufficient size to permit the bobbins to descend therethrough into the guide tube of the doffing machine. The magazine is supported by hangers 20$^a$ secured to the ends thereof, said hangers having mounted thereon grooved rollers 19$^a$ arranged to engage and travel along the guide rail 10$^a$. When the doffing machine is to be driven by electricity, as in the present instance, the rollers 19$^a$ may be made of insulating material, or said rollers may be electrically insulated from the magazine in any other suitable manner, as by providing insulated bushings or hubs for said rollers. Mounted in forwardly projecting arms upon the hangers 20$^a$ is a rod 24$^a$ extending longitudinally of the magazine and upon this rod is pivoted a series of spring-pressed catches 22$^a$, each arranged to overlie the lower portion of one of the ways in the magazine and engage the lowermost bobbin therein. To the forward wall of the magazine at opposite ends thereof is secured a pair of bars 14$^a$ 15$^a$, each having a perforated lug to which is attached lugs upon a spacing rail 18$^a$, the lugs upon said bars and rail 18$^a$ being secured together by pins 16$^a$. The rail 18$^a$ extends longitudinally of the magazine. Referring to Fig. 31, it will be noted that the bars 14$^a$ 15$^a$ which project horizontally from the ends of the magazine are different lengths, the longer bar projecting from the end toward the direction of travel of the magazine.

When the type of magazine shown by Figs. 29 to 32 is used the standard 67 of the doffer frame is provided with a rearwardly extending and diverging member 18$^b$, the ends of which embrace the spacing bar 18$^a$. It will be seen that by removing the pins 16$^a$ which hold said spacing bar in place the doffing machine may be readily disconnected from the magazine. The spacing bar 18$^a$ is provided on its lower edge with a series of segmental recesses 21$^a$ and alternating with these recesses are relatively deep notches 11$^a$. The standard 67 on the doffing machine is provided at its upper end with a bearing for a horizontal shaft 12$^a$ which has fixed thereon a disk 13$^a$. A roller stud 9$^a$ upon the disk 13$^a$ is arranged to enter and engage with the notches 11$^a$ in the spacing bar 18$^a$ (Fig. 32) to move the magazine, when the shaft 12$^a$ is rotated, in a direction opposite to the direction of travel of the doffing machine along the spinning frame. The disk 13$^a$ immediately below the spacing bar 18$^a$ is provided with a locking disk 5$^a$ arranged to rotate in the segmental recesses 21$^a$ to lock the rail 18$^a$ and therefore the bobbin magazine to the doffer, so that the magazine will travel along with the doffer. Said disk 5$^a$ is cut away at a point opposite to the roller stud 9$^a$, so that when said stud enters one of the recesses 21$^a$, the space bar 18$^a$ will be unlocked and will be free to be moved by said roller stud in an opposite direction. The shaft 12$^a$ has a rectangular forward portion upon which is mounted a bevel-gear wheel 216 that is driven by a pinion 217 upon the upper end of a vertical shaft 218. Said shaft 12$^a$ has in addition to the rectangular portion which carries the bevel gear 216 a reduced portion which is encircled by a coiled spring, the tendency of which is to move the shaft rearward and disengage the roller stud 9$^a$ and the lock disk 5$^a$ from the spacing bar 18$^a$. The shaft 12$^a$ may be moved and held to place said disk and roller stud in operative position by a cam lever 219, or other suitable means for moving said shaft against the action of the spring. The catches 22$^a$ on the magazine may be operated by a suitable trip carried by a vertical rod 1$^a$ on the doffer, said rod being reciprocated successively to release bobbins in the magazine until one of the inclined ways has been emptied, after which the magazine will be moved in a direction opposite to the movement of the doffer by the means above described to bring the next bobbin-supporting way in proper position over the guide tube of the doffer. The shaft 1$^a$ will make four reciprocations or movements to one rotation of the shaft 12$^a$.

It will be noted that but very little change will be required to adapt the doffing machine to either form of magazine; both forms are readily applicable to the frames, and when in actual use in no way interfere with the operative parts of the spinning frame.

In operation, the doffer is placed upon the guide rails 2 and 3 on the spinning frame and the handle 103 operated to move the eccentric bearings for the upper supporting rollers and thus bring the lower rollers and the toothed wheel 73 into engagement with their coöperating rails. The mechanism of the doffer may then be operated by a hand crank on the stub shaft 35$^c$ to bring the doffer head into its elevated position, and the doffer framework is positioned on the spinning frame with the elevated doffer head directly above the first spindle. The empty bobbins are arranged so that there will be none in the lower portion of the guide tube 130 above the lower catch 162, but there will be a bobbin in the lower end of the inverter tube and supported by the upper catch 161. The switch 32 may now be closed to supply current to the motor for driving the mechanism. As the doffer head descends over the first spindle the bobbin seater 149 will simultaneously descend, but since there is no bobbin in the lower portion of the guide tube 130, the bobbin seater in this first movement will be idle. When the doffer head reaches its lowermost position the bell crank 71 is operated to raise the adjacent link 166 of the doffer head, whereby to slide the wedge member 175 and thus permit the spanner bars 179 to close one of the jaws of the doffer head about the filled bobbin on the spindle. The doffer head is now moved upwardly to remove the bobbin from the spindle and at this time the motor 31 is performing no other work than to break the frictional engagement between the bobbin and its spindle. Just after the bobbin has been raised above the upper end of the spindle the cutter support 80 will be slid between the bobbin and the spindle and the cutter 81 operated to sever the thread. At this time the star wheel 195 is engaged by the roller stud 74 on the cam member 75 to rotate said star wheel and cause the doffer to be advanced one step along the spinning frame. As the doffer is advanced the doffer head will be rotated to bring the filled bobbin carried thereby above the discharge chute 23 leading to the bag for filled bobbins. And upon the next operation of the doffer head the filled bobbin previously removed will be dropped into said bag. Meanwhile the cutter support 80 has been withdrawn so as to be out of the path of the descending doffer head upon its next movement. Upon the succeeding descent of the doffer head the pivoted arm 152 will be swung by the roller stud 145 upon the bobbin-seater-slide to trip the bobbin-retaining catches of the magazine and release a bobbin therefrom, and also to remove the bobbin catches 161 and 162 from the guide tube 130 to permit a bobbin supported by the lower catch 162 to descend upon the empty spindle from which a bobbin has just been doffed, and also to permit a bobbin to descend from the lower end of the inverted tube 131 onto the head of the bobbin seater which has previously been projected into the guide tube. As the doffer head descends it will perform its functions as explained above and the bobbin seater will engage the upper end of the bobbin upon the spindle and firmly press the bobbin in place. This cycle of operation is repeated for each bobbin as the doffer advances along the spinning frame. The main actuating shaft 34 and the parts carried thereby are arranged to move the mechanism through a complete cycle in each revolution of the main shaft.

While we have herein described in detail an illustrative embodiment of our invention, we recognize that many modifications within the scope of the invention may be made by persons skilled in the art, and we therefore do not limit the invention to the details herein disclosed.

We claim—

1. In a bobbin removing mechanism for spinning frames, a vertically reciprocable and horizontally revoluble doffer head provided with bobbin engaging means located at each side of its center and means for actuating said head.

2. In a bobbin removing mechanism for spinning frames, a doffer head having bobbin engaging means at each end adapted to doff a full bobbin and means for alternately opening and closing the bobbin engaging means.

3. In doffing mechanism for spinning frames, a plurality of superimposed bobbin engaging means duplicated on opposite sides of a support, means for simultaneously moving the bobbin engaging means to release a bobbin maintained thereby and independently acting means for closing the opposite bobbin engaging means.

4. A doffer head for removing filled bobbins from spinning frames comprising duplex bobbin engaging means mounted to have a horizontal rotary motion and a vertically reciprocatory motion and means for simultaneously opening one set of bobbin engaging means and closing the other set of bobbin engaging means.

5. A doffer head having a reciprocatory member for separating bobbin engaging means and means for closing other bobbin engaging means which constitute a part of the doffer head.

6. A doffer head having a base with apertures through the end portions thereof, means for connecting to the base a plurality of bobbin engaging means, a movable element for separating the bobbin engaging means and springs for exerting pressure upon the bobbin engaging means.

7. A doffer head having oppositely extending bobbin engaging members, a bar operatively mounted on the head and adapted to engage with the oppositely extending bobbin engaging members and a spring mounted to exert pressure upon the bar.

8. A doffer head comprising an apertured base, bobbin grasping members pivoted on opposite sides of the longitudinal center of the base, means for exerting a pressure which moves the outer ends of the bobbin grasping members inward and means for simultaneosuly moving the outer ends of opposite bobbin grasping members one away from the other.

9. A duplex doffer head provided on opposite sides of its transverse center with bobbin grasping means, a member associated with means to reciprocate the same to effect a separation of the bobbin engaging means with which it engages and means engaging the bobbin engaging means in the same horizontal plane to exert pressure which tends to move the end portions of the bobbin engaging means toward each other.

10. A doffer head having bobbin engaging means which extend from the transverse center thereof, and means for closing said bobbin-engaging means comprising a bar adapted to engage the bobbin engaging means located substantially in the same plane as the bobbin engaging means and means for forcing the bar toward the bobbin engaging means.

11. A duplex doffer head for movable doffing mechanism of spinning frames, a rotatable support for such doffer head and means for arresting the rotary movement of the doffer head when positioned diagonal to the line of travel of the doffing mechanism.

12. A duplex doffer head for doffing mechanism for spinning frame, a rotatable support therefor connected to the central portion of the doffer head and adapted to bring one of the ends of the doffer head over a spindle and the opposite end forward of the line of spindles.

13. In doffing mechanism for spinning frames, a doffer head having on opposite ends bobbin engaging members, a slide for effecting an opening of each of the end members, a ternate member pivoted to the doffer head; one member thereof engaging the slide and bars connected to the other arms of the ternate member.

14. The combination with a spinning frame having two guideways thereon, of bobbin-placing mechanism mounted to travel on one of said ways, and a magazine for empty bobbins associated with the bobbin-placing mechanism and mounted to travel on the other of said ways.

15. In doffing mechanism for spinning frames, a magazine-support maintained by the spinning frame, a magazine for bobbins which is adapted to be carried by the support, a doffer mechanism having associated therewith means for releasing bobbins from the magazine, means for effecting travel of the magazine upon its support in the same direction as the travel of the doffing mechanism and means for moving at intervals the magazine in a direction opposite to the direction of travel of the doffing mechanism.

16. In doffing mechanism for spinning frames, a magazine support attached to a spinning frame, a magazine for bobbins maintained by said support to travel thereon, a doffing mechanism having means for maintaining a bobbin carried by the magazine in line with bobbin receiving means on the doffing mechanism and means on the doffing mechanism for releasing a bobbin from the magazine.

17. The combination of a spinning frame having supporting means for a bobbin magazine, a bobbin magazine mounted to travel on said supporting means, ways forming a part of the magazine with which the bobbins engage to be retained thereby, doffing mechanism, means associated with the magazine and with the doffing mechanism whereby a bobbin is maintained by the magazine in position to be deposited when released in bobbin placing means of the doffing mechanism and means on the doffing mechanism for releasing a bobbin from the magazine.

18. The combination of a spinning frame having means attached thereto for supporting a bobbin magazine, a bobbin magazine mounted to travel on said supporting means, ways constituting a part of the magazine to support a plurality of bobbins so that one of the bobbins will be positioned in line with doffing mechanism, a doffing mechanism which is movable lengthwise of the spinning frame, and means on the doffing mechanism for releasing a bobbin from the magazine.

19. In doffing mechanism for spinning frames, means for supporting upon the spinning frame a bobbin magazine, a bobbin magazine that engages the support to be movable along the spinning frame, and a doffing mechanism mounted on the spinning frame and movable along the same; said doffing mechanism having means for releasing a bobbin from the magazine.

20. In doffing mechanism for spinning frames, a magazine support maintained by the spinning frame, a bobbin magazine which is adapted to maintain a plurality of bobbins such magazine being mounted upon the support to be movable lengthwise of the spinning frame, a doffing mechanism, means on the doffing mechanism for engagement with the magazine to effect movement of the magazine in the same direction as the direction of movement of the doffer mechanism and at intervals a movement opposite to the direction of movement of the doffer mechanism, and means for releasing bobbins one at a time from the magazine.

21. In combination with a spinning machine having a longitudinal way attached thereto, a bobbin magazine maintained in movable engagement with the way, of a bobbin placing mechanism which is movable along the spinning machine and means for associating the bobbin magazine and the bobbin placing mechanism so that they will move in unison for a predetermined distance after which a reverse movement is imparted to the magazine.

22. In doffing mechanism for spinning frames, a doffing mechanism to which an intermittent travel along the front of the spinning frame is imparted, a bobbin magazine suspended from the spinning frame, means for associating the doffing mechanism and the magazine so that they will move together along the spinning frame for a predetermined distance and means for arresting the movement of the magazine periodically relative to the travel of the doffing mechanism.

23. In doffing mechanism for spinning frames, a doffing mechanism which is mounted on the spinning frame to travel longitudinally thereon, a bobbin magazine maintained in longitudinally movable engagement with the spinning frame and having a plurality of ways for empty bobbins, means for holding the bobbins in the ways, means for associating the magazine and the doffing machine to maintain one of the ways with bobbins therein in proper relation to the doffing mechanism during its travel along the spinning frame and means for actuating the bobbin holding means to release a single bobbin at a time from one of the ways.

24. In combination with a spinning machine, a longitudinally maintained magazine support mounted on said spinning frame, a bobbin magazine maintained in movable engagement with the support, a doffing mechanism which is movable along the spinning frame and means carried by the doffing mechanism for releasing bobbins from the magazine.

25. In doffing mechanism for spinning frames, a bobbin magazine having a plurality of inclined ways by which bobbins are suspended, catches for retaining bobbins in said ways, a doffing mechanism which is movable along the spinning frame and means associated with the doffing mechanism for actuating the catches to release a bobbin from the magazine.

26. In bobbin placing mechanism for spinning frames, the combination with bobbin placing mechanism having means associated therewith for moving the same along a spinning frame, a bar maintained in movable engagement with the bobbin placing mechanism, means for moving the bar with and independent of the movement of the bobbin placing mechanism, of a bobbin magazine maintained by the spinning frame, means for connecting the bar to the magazine and rotary means on the bobbin placing mechanism that engages the bar to move the same so that a bobbin carried by the magazine will be in alinement with the bobbin placing mechanism.

27. In bobbin placing mechanism for spinning frames, the combination of a bobbin magazine comprising a plurality of bobbin supporting ways, means carried by the magazine for retaining bobbins in the ways, a bobbin placing mechanism, means for associating the magazine with the bobbin placing mechanism comprising a bar and attaching means, a rotary element carried by the bobbin placing mechanism for engagement with the bar to move the magazine with the bobbin placing mechanism and to periodically move the magazine independent of the movement of the bobbin placing mechanism.

28. In doffing mechanism, a bobbin removing instrumentality, a carriage having an opening therethrough, a guide below the opening and a bobbin receptacle below the guide.

29. In doffing mechanism for spinning frames, a carriage mounted upon the spinning frame, an intermittently actuated gear for moving the carriage along the spinning frame, bobbin removing means supported to have a vertically reciprocatory movement imparted thereto when in vertical alinement with a spindle and means for imparting a partial rotary movement to the bobbin removing means during the travel of the carriage.

30. The combination with a spinning frame, of a framework having bobbin-placing mechanism mounted to travel along said frame, a bobbin magazine, means on the spinning frame for supporting the magazine independently of said framework for movement along the spinning frame with the bobbin-placing mechanism, and means for changing the position of the magazine relative to the bobbin-placing mechanism to locate bobbins maintained by the magazine in position to be delivered to the bobbing-placing mechanism.

31. The combination with a spinning frame, of bobbin-placing mechanism mounted to travel along said frame, a bobbin magazine mounted on said spinning frame independently of the bobbin-placing mechanism and adapted to be movable with the bobbin-placing mechanism, means for effecting the transfer of said bobbins from the magazine to the bobbin-placing mechanism, and means operating when a number of bobbins have been supplied to the bobbin-placing mechanism to move the magazine relative to the bobbin-placing mechanism.

32. The combination with a spinning frame having upper and lower guide means thereon, of bobbin-placing mechanism mounted on the lower guide means to travel along the spinning frame, a magazine for empty bobbins mounted on the upper guide means to travel thereon, and means for successively releasing bobbins from the magazine to be supplied to the bobbin-placing mechanism.

33. A doffer head comprising two bobbin-engaging devices, and means for opening either of said devices and simultaneously closing the other device.

34. In a doffing machine, the combination of a doffer head comprising two bobbin-engaging devices, means to receive bobbins from said devices, and mechanism for reciprocating the doffer head and for rotating the latter to bring said bobbin-engaging devices alternately into position above the row of spindles on the spinning machine and into operative relation with said bobbin-receiving means.

35. In a doffing machine, the combination of a doffer head comprising a plurality of bobbin-engaging devices, means for successively moving said devices into operative association with bobbins on the spindles of a spinning frame, spring-actuated means tending to close said devices, and means for opening said devices at the proper time to permit their engagement with a bobbin to be doffed and to permit the doffed bobbins to escape from the device.

36. In a doffing machine, the combination of a doffer head comprising two oppositely extending bobbin-engaging devices, means for rotating said head to bring said devices alternately into line with the row of spindles on the spinning machine, means for imparting to said head a reciprocatory doffing movement, and means acting at the lower portion of movement of the doffer head to close one of said bobbin-engaging devices upon a bobbin, and to open the other device to permit a previously doffed bobbin to escape.

37. In a doffing machine, the combination of a doffer head comprising two bobbin-engaging devices, spring-actuated means tending to close said devices, and a reciprocatory slide arranged to alternately open said devices against the opposition of said spring-actuated means.

38. In a doffing machine, the combination of a doffer head comprising two oppositely extending bobbin-engaging devices each consisting of pivoted fingers, spring-actuated means tending to move the fingers of each device toward each other, and a reciprocatory slide having wedge-shaped ends arranged to separate the fingers of the two devices alternately against the opposition of said spring-actuated means.

39. In doffing mechanism, the combination of a body portion having a donning tube thereon, a magazine mounted for movement with relation to said body portion and having a plurality of bobbin compartments, a toothed element on said magazine, and means mounted on said body portion and engaging said toothed element for intermittently moving the magazine with respect to the body portion to place said bobbin compartments in position to discharge the bobbins into said donning tube.

40. The combination with a spinning frame, of a magazine for empty bobbins mounted thereon for traveling movement, doffing mechanism mounted on the spinning frame, the magazine and the doffing mechanism being supported on the spinning frame independently of each other, means for advancing said doffing mechanism and said magazine together with relation to the spinning frame, and means for effecting relative movement between the doffing mechanism and the magazine.

41. The combination with a spinning frame, of doffing mechanism mounted to travel along said frame, and a magazine for empty bobbins supported on the spinning frame independently of the doffing mechanism and arranged to have a relative traveling movement with respect to said frame and also with respect to the doffing mechanism.

42. The combination with a spinning frame, of doffing mechanism adapted to travel along said frame, a magazine mounted on the spinning frame independently of the doffing mechanism and arranged to contain a plurality of rows of bobbins, and mechanism for causing the magazine to travel with the doffing machanism along the spinning frame, and for shifting the magazine with respect to the doffing mechanism to position the respective rows of bobbins.

43. The combination with a spinning frame, of a magazine mounted on said frame for traveling movement longitudinally thereof, said magazine having a plurality of compartments each containing a row of bobbins, bobbin-placing means arranged to travel along the spinning frame, the magazine and the bobbin-placing means being supported independently of each other, means for transferring the bobbins singly and successively from said magazine to said bobbin-placing means, means for causing the bobbin magazine and the bobbin-placing means to travel together along the spinning frame, and means for shifting the bobbin magazine with respect to the bobbin-placing means to position the respective rows of bobbins.

44. In a doffing machine, the combination of a body portion having a vertical donning tube mounted thereon, a magazine for empty bobbins mounted above said donning tube for horizontal movement with relation thereto, a vertical drive shaft carried by said body, a toothed bar carried by the magazine, and means meshing with said bar and operatively connected to the uper end of said shaft for moving said magazine with relation to said body portion and said donning tube.

45. The combination with a spinning frame, of bobbin-placing means arranged to travel along said frame, a bobbin magazine mounted on the spinning frame to travel with said bobbin-placing means, said magazine being arranged to contain a plurality of rows of bobbins, a tooth bar fixed with relation to said magazine, and a rotary element traveling with said bobbin-placing means and coöperating with said tooth bar, said rotary element being actuated at intervals to move the magazine with respect to said bobbin-placing means for positioning the respective bobbins.

In testimony whereof we affix our signatures in the presence of two witnesses.

ARTHUR GEO. BOOZER, JR.
GEORGE HILL.

Witnesses:
VAN CLEVELAND,
R. P. CARSON.